(12) United States Patent
Scheurer et al.

(10) Patent No.: US 9,878,446 B2
(45) Date of Patent: Jan. 30, 2018

(54) DETERMINATION OF OBJECT-RELATED GRIPPING REGIONS USING A ROBOT

(71) Applicant: KUKA Roboter GmbH, Augsburg (DE)

(72) Inventors: Christian Scheurer, Augsburg (DE); Stephanie Bobert, Schwibbogenplatz 2f (DE); Uwe Zimmermann, Vogelmauer (DE)

(73) Assignee: KUKA Roboter GmbH, Augsburg (DE)

( * ) Notice: Subject to any disclaimer, the term of this patent is extended or adjusted under 35 U.S.C. 154(b) by 175 days.

(21) Appl. No.: 14/934,667

(22) Filed: Nov. 6, 2015

(65) Prior Publication Data
US 2016/0136807 A1    May 19, 2016

(30) Foreign Application Priority Data
Nov. 13, 2014   (DE) .................. 10 2014 223 167

(51) Int. Cl.
*B25J 13/02*   (2006.01)
*B25J 9/16*   (2006.01)

(52) U.S. Cl.
CPC ........... *B25J 9/1612* (2013.01); *B25J 9/1669* (2013.01); *B25J 13/02* (2013.01); *G05B 2219/39065* (2013.01); *G05B 2219/39466* (2013.01); *G05B 2219/39476* (2013.01); *G05B 2219/39484* (2013.01); *G05B 2219/39543* (2013.01); *Y10S 901/02* (2013.01)

(58) Field of Classification Search
CPC ......... B25J 9/1612; B25J 9/1669; B25J 13/02
USPC ............................................. 700/250
See application file for complete search history.

(56) References Cited

U.S. PATENT DOCUMENTS

| | | | | |
|---|---|---|---|---|
| 4,980,626 A * | 12/1990 | Hess | .......... | B25J 9/1005 250/559.33 |
| 5,325,468 A * | 6/1994 | Terasaki | .......... | B25J 9/1661 700/262 |
| 7,957,583 B2 * | 6/2011 | Boca | .......... | B25J 9/1697 345/419 |
| 8,095,237 B2 * | 1/2012 | Habibi | .......... | B25J 9/1692 29/702 |
| 8,437,535 B2 * | 5/2013 | Boca | .......... | G01B 11/25 382/154 |
| 8,559,699 B2 * | 10/2013 | Boca | .......... | B25J 9/1679 382/153 |

(Continued)

FOREIGN PATENT DOCUMENTS

| | | |
|---|---|---|
| EP | 2481529 | 8/2012 |
| EP | 2263837 | 6/2013 |
| EP | 2657863 | 10/2013 |

OTHER PUBLICATIONS

Examination Report from GPTO in DE Appl. No. 10 2014 223 167.1, dated Jul. 22, 2015.

(Continued)

*Primary Examiner* — Patrick H Mackey

(57) ABSTRACT

The invention relates to a method and a system for determining gripping regions on an object. The object is to be gripped, based on the determined gripping regions, by means of a robot. At least one first gripping pose of the robot is taught at the object, and additional gripping poses are determined at the object. Based on these gripping poses, a first gripping region is configured.

12 Claims, 4 Drawing Sheets

(56) References Cited

U.S. PATENT DOCUMENTS

| | | | |
|---|---|---|---|
| 8,879,822 B2 | 11/2014 | Matsumoto | |
| 8,886,358 B2* | 11/2014 | Sato .................. | B25J 9/1669 |
| | | | 700/253 |
| 9,014,850 B2* | 4/2015 | Ota .................. | B25J 9/1669 |
| | | | 700/245 |
| 9,014,857 B2* | 4/2015 | Ota .................. | B25J 9/1669 |
| | | | 700/245 |
| 9,199,376 B2* | 12/2015 | Wells ................ | B25J 9/1612 |
| 9,266,237 B2* | 2/2016 | Nomura ............ | B25J 9/1612 |
| 2013/0245822 A1* | 9/2013 | Kawanami ........ | B25J 9/1669 |
| | | | 700/245 |

OTHER PUBLICATIONS

The extended European Search Report, dated Jun. 24, 2016, in the related European Patent Appl. No. 15192025.3.

* cited by examiner

DETERMINATION OF OBJECT-RELATED GRIPPING REGIONS USING A ROBOT

This application claims the benefit of priority under 35 §119(a) to German Patent Application No. 10 2014 223 167.1, filed on Nov. 13, 2014.

TECHNICAL FIELD

The present invention relates generally to a method and a system for determining gripping regions at objects, wherein the objects are to be gripped by a robot by means of a gripping pose based on the determined gripping regions.

TECHNICAL BACKGROUND

A robot is a programmable and highly versatile manipulation device. They can be used in mobile or stationary applications and can be employed for various tasks thanks to the freely-programmable movement sequence. Robots are used for various work processes in, for example, industrial assembly or production. Generally speaking, a robot consists of a manipulator (robot arm), which can be moved by means of appropriate drives and a control device. An end effector is usually provided at the end of a robot arm, which end effector can, as a working body, perform various tasks. Measuring devices, screwdrivers, testing devices or even grippers can be used as end effectors, for example. A gripper is a manipulation device, which establishes temporary contact with a gripped object and ensures the position and orientation of the gripped object during the pick-up and set-down operations. The holding of the gripped object is achieved, for example, by means of force-generating, form-fitting or material-matching components.

In order to grip an object to be gripped, a teaching of individual points fixed in space is usually realized. The robot is thus positioned, e.g. manually, such that the gripper is located in an appropriate position at the object to be gripped. After this positioning of the robot, the corresponding pose is stored as a gripping pose. The grip of the robot should be selected such that it can be executed in a collision-free manner and is also solid, so that the object cannot slip or shift in the gripper. Special restrictions must also be considered, since the object may not be able to be gripped at all positions.

This method of individual grip determination has a number of disadvantages. Thus, a successful execution of a fixed-programmed grip requires that the object to be gripped is always located in the same position and, if appropriate, has the same orientation in space. However, this is not always the case in complex working environments where both humans and multiple robots work together. Furthermore, a successful execution of a fixed-programmed grip also requires that the robot is always located at the same position. However, in mobile robotics it is entirely possible for the positioning accuracy of a mobile robot to be inadequate to the task of sufficiently accurately applying a firm grip to a target object. In addition, most objects offer more than just one possible solid grip, but these are not taken into consideration in the above-described method.

The European patent application EP 2 263 837 A1 describes a method, wherein, amongst other things, a primary shape model is adjusted according to 3D-position data of a space, which corresponds to a detection area, which is acquired using a distance measuring device. U.S. Pat. No. 8,355,816 B2, which was published in the English language on Jan. 15, 2013 and corresponds to European patent application EP 2 263 837 A1, is hereby incorporated by reference in its entirety herein.

The patent document EP 2 657 863 A2 describes a method for generating robot grip patterns using a plurality of proximity beams which are associated with an object. U.S. Pat. No. 9,014,857 B2, which was published in the English language on Apr. 21, 2015 and corresponds to European patent document EP 2 657 863 A2, is hereby incorporated by reference in its entirety herein.

These two methods are also relatively complex and permit no intuitive identification of gripping poses by the operator.

Given this technical background, the objective of the present invention is to provide a method and a system, to allow simple and easy determination of possible gripping poses. Gripping poses should preferably be taught directly, using a robot at the actual object. Another objective of the present invention is to provide a method for determining gripping poses at an object and for gripping an object, which eliminates or minimizes the above-mentioned disadvantages. The objective is achieved with the method according to Claim 1 and Claim 11 and with the robot system according to Claim 12.

Content of the Invention

A method according to the invention relates to the determination of at least one gripping region at an object, wherein the object is to be gripped by a gripper in a gripping pose in the gripping region, i.e. based on this gripping region. The gripper is preferably guided by a robot, and is preferably designed as an end effector and connected to the robot. The gripping regions comprise those regions that are available to the gripper for gripping the object. Gripping regions can thus be considered to be (object proximity) working spaces for the gripper, with the gripper being able to move in the working space in order to grip the object. The person skilled in the art will understand that the gripping regions should be defined such that collisions between the gripper or robot and the object are avoided as much as possible.

The term "grip" is not limiting and covers all procedures for manipulating or picking up an object. Thus the object can be gripped, for example, by means of a pincer movement, or it can be picked up by means of a magnet or a vacuum. Similarly, the term "gripper" covers various manipulation devices or end effectors, which can be used for the corresponding "gripping". The objects can, in turn, be any object at all which is suited for gripping via a gripper, in particular by a robot.

In a first step, an object coordinate system of the object which is to be gripped by the gripper is defined. This step can, for example, be executed offline by the operator at a computer. The definition of the object coordinate system can be realized taking into account the structure of the object to be gripped. Thus, for example, for an object having a bar, or a rod, or the like for gripping the object, the object coordinate system can be defined such that one axis of the object coordinate system coincides with the orientation of the bar to be gripped. The object coordinate system is preferably a Cartesian coordinate system.

In another step, at least one first gripping pose is configured by positioning the gripper at the object. The person skilled in the art will understand that the operator can, in this step, manually guide ("manual teaching") the gripper or robot arm, for example using telemanipulation, for example by means of control keys and/or a joystick or the like. However, the manual teaching preferably involves active guiding of the gripper or robot by hand, wherein the gripper or robot is itself gripped and guided. Alternatively, the term "teaching" is also understood here to mean an offline programming, which can be based, for example, on structural data of the object. When "teaching" is mentioned hereafter, this term thus always encompasses all forms of "teaching" (incl. offline methods), unless explicitly stated otherwise. The first gripping pose of the gripper is preferably situated at one end of a grippable region at the object. If, for example, the object is to be gripped on a bar, the first gripping pose can correspond to a gripping of one end of this bar. Furthermore, a second configured gripping pose can correspond to a gripping of the other end of this bar. The number of the gripping poses to be configured can vary, and the person skilled in the art will understand that persons skilled in the art will employ their own judgement when configuring, by means of positioning of the gripper, the number of gripping poses in the case of objects having complex structures.

In another step, additional gripping poses at the object are specified. This specification preferably comprises a calculation or identification of additional gripping poses based on the configured or taught gripping pose(s). If, for example, two gripping poses along a bar were configured in a previous step, then the specification of additional gripping poses preferably comprises the specification of many gripping poses between these two configured gripping poses. The specification of additional gripping poses is preferably realized taking into account translational and/or rotational degrees of freedom of the object. The specification is preferably realized by the operator offline at a computer. Previously provided structural data, in particular CAD data of the object, can also preferably be taken into account, if such data is available. Structural data very generally includes all data containing any structural information regarding the object to be gripped. Structural data, i.e. data which is representative, for example, of the geometry of the object, can also be manually entered into the controller, or automatically generated, for example using visual measurement methods.

In another step, a first gripping region of the object is determined, based on the configured and specified gripping poses, with this gripping region being determined in the defined object coordinate system of the object. Preferably, this first gripping region is stored in a subsequent step for later use. An initial gripping pose can preferably also be configured here and, together with the gripping region, stored for later use. Advantageously, additional parameters can be stored together with an initial gripping pose, such as, for example, positions of fingers, which can be advantageously used in particular by robots having 3-finger or multi-finger grippers in order to grip the object. This step of determination of a first gripping region is likewise preferably executed offline by means of a computer. It is also preferable that this step too occurs based on previously provided structural data.

The method thus makes it possible to easily and intuitively configure possible gripping regions for an object. Only a few gripping poses must be directly configured at the object, i.e. actively defined by a human, for example. By means of clever selection of the gripping poses to be configured or to be taught, additional gripping poses can be determined making use of the structure of the object to be gripped, without having to realize complex manual teaching of these and without having to realize complex simulations. Because the gripping regions and preferably also the gripping poses are configured in the object coordinate system of the object, the gripping regions are independent of the position of the object in the real world. Thus the gripping regions of an object are configured in relation to the object itself, in other words, independently of the absolute position of the object. It is thus possible to determine gripping regions in a position-independent manner and, in addition, to identify gripping poses from the gripping regions, independently of the position of the object to be gripped.

Generally preferably, the object can be gripped by a gripper provided on a robot, with the object being identified by means of sensors. These sensors can preferably comprise optical sensors, which are preferably mounted on the robot. For example, the sensors can comprise stereo camera systems, 3D camera systems or the like. The robot can thus, preferably based on the provided structural data, for example from CAD data, identify the object by comparing the acquired data with the stored data of the object. It is thus possible to provide the object without complex positioning in order to determine gripping regions at this object.

A method according to the invention for gripping of an object by a robot comprises the provision of a gripping region which has been determined by means of the method for determining gripping regions. The robot can be any type of robot having at least one end effector, which is suited to gripping an object. In another step, both a robot and an object are provided, wherein the object is to be gripped by the robot. Based on the provided gripping regions, a gripping pose is selected. The selection can comprise choosing of a configured first gripping pose, which has been configured together with the gripping region. The robot can also select another suitable gripping pose, also taking into account its current position and the position of the object and, preferably, also taking into account the orientation of the object, and taking into account obstacles or possible collisions, etc. In a subsequent step, the selected gripping pose is approached by the robot, and the object is gripped.

The method also allows the determined gripping regions to be tested directly with regard to feasibility and suitability. Thus, for example, gripping poses generated from the gripping regions can be directly approached by the robot, for the purpose of testing them. The method also allows the object geometry to be exploited directly when constructing or determining the gripping regions. In addition, the method requires only limited computing capacity, since no complex computation has to be realized. Furthermore, the determined gripping regions correspond to the vision of the operator, since no unintentional gripping regions or gripping poses can be generated. Accordingly, accidentally executed grips, which could otherwise cause collisions, can be avoided.

The robot system according to the invention—comprising a robot, which is configured to grip objects by means of a gripper—is equipped with a control device, which is configured to execute a method according to the invention, so as to be able to implement the described steps of the method. The robot system preferably comprises at least one sensor, which is configured to identify objects.

EXEMPLARY EMBODIMENTS

The invention is explained in greater detail below with reference to the accompanying figures, in which:

FIG. 1a and FIG. 1b schematically depict two exemplary grips of a robot on an object;

FIGS. 2a and FIG. 2b schematically depict two exemplary grips of a robot on another object;

Figure 1A:
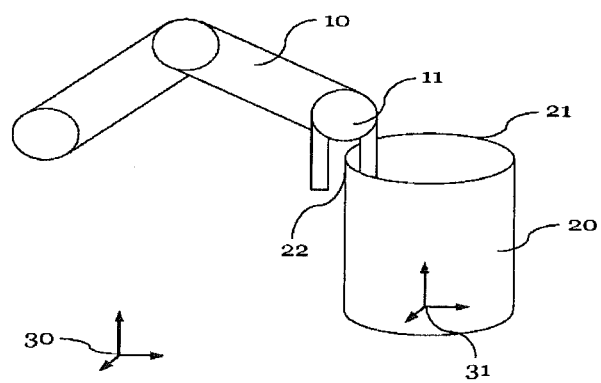
Figure 1B:
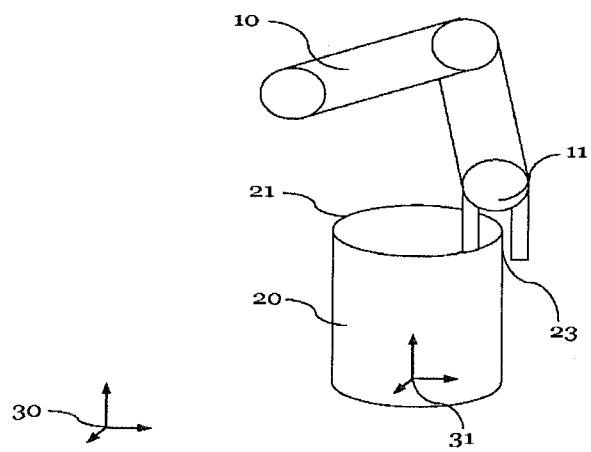

FIGS. 1a and 1b show a robot arm 10 of a robot, and an object 20 to be gripped. The robot arm 10 has, at one end thereof, an end effector, which is designed as a gripper 11 having two gripping fingers. The invention is not, however, limited to such mechanical grippers, but rather also comprises grippers in the form of e.g. vacuum grippers or magnetic grippers. The object to be gripped 20 has the shape of a tube, and the object 20 is to be gripped by the robot 10 at the edge 21 of the tube-shaped objet 20. There are many options for the robot 10 for gripping the object 20 at its edge 21. For example, as depicted in FIG. 1a, the robot 10 can grip the object 20 at the point 22, or, for example, as depicted in FIG. 1b, at point 23.

FIGS. 1a and 1b also show, by way of example, the origin of the global coordinate system 30 and the origin of the object coordinate system 31, which do not coincide. The object coordinate system 31 is advantageously set in the center of the cylinder-shaped object 20, with one axis of the Cartesian object coordinate system 31 corresponding to the longitudinal direction of the object 20. By means of the method, gripping regions are defined in terms of the object coordinate system 31 of the object 20, so that the gripping regions can be determined independent of the absolute position of the object in the global coordinate system 30.

Figure 2A:
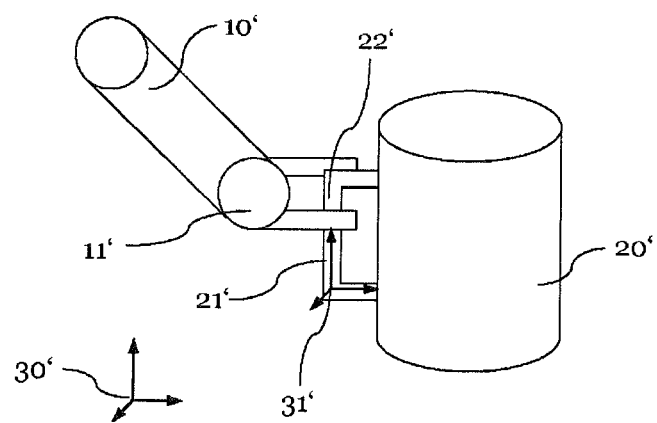
Figure 2B:
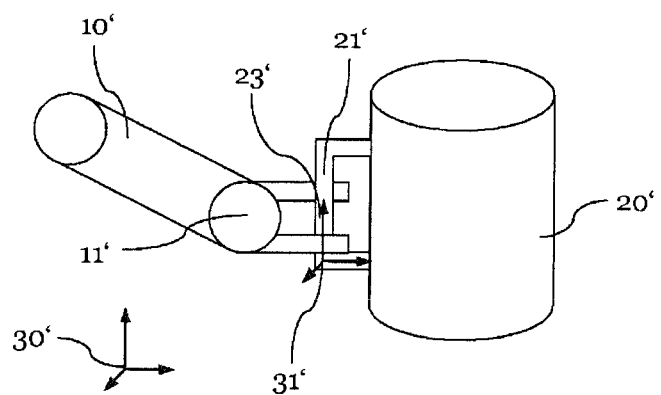

FIGS. 2a and 2b show another situation, in which the object 20' is to gripped by means of the gripper 11' of the robot arm 10' at the handle 21' of the object 20'. Here too, there are various options for gripping the object 20', thus the object 20' can be gripped, for example, as depicted in FIG. 2a, at position 22', or, for example, as depicted in FIG. 2b, at position 23'. By contrast with the depiction of FIGS. 1a and 1b, the object coordinate system 31' is advantageously laid out in FIGS. 2a and 2b such that one axis of the object coordinate system 31' coincides with the longitudinal direction of the grip 21'.

The person skilled in the art will understand that, for one object, several object coordinate systems can also be defined. When the object 20' of FIGS. 2a and 2b can be gripped both at the handle 21' and at the top edge, as is the case in FIGS. 1a and 1b, then it is possible to define, in addition to the object coordinate system 31', another object coordinate system, which coincides, for example, with the object coordinate system 30 from FIGS. 1a and 1b. In addition, one or more reference points can also be defined, which configure, for example, the position of the object in the global coordinate system 30, 30' and/or configure, for example, the position of the grippable region 21, 21'.

Figure 3:
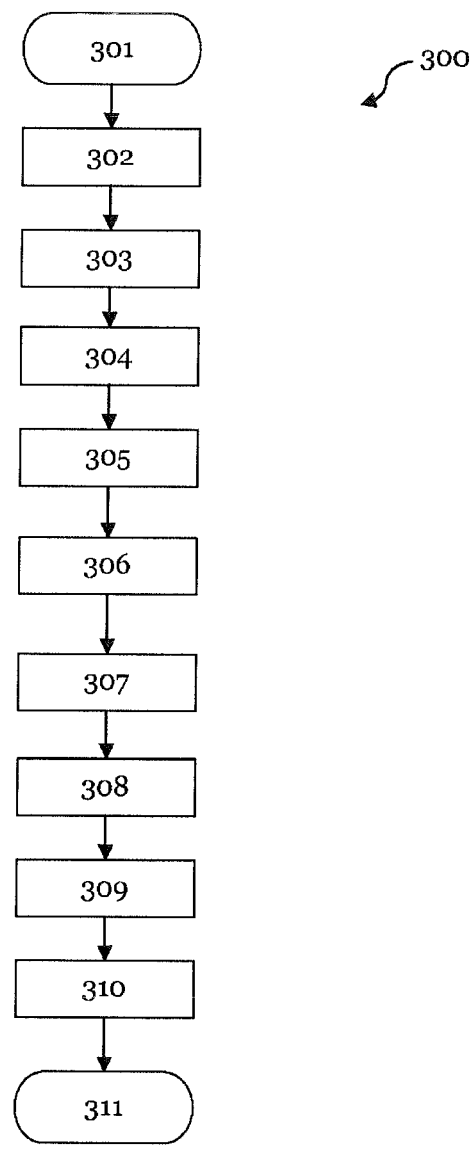
FIG. 3 shows a flowchart, which depicts, in a schematic and exemplary manner, the sequence of a method for determining gripping regions at an object.

FIG. 3 shows a sequence diagram for carrying out an exemplary method 300. The method 300 is described below in an exemplary manner with reference to the system depicted in FIG. 1a or FIG. 1b. The method begins in step 301. In step 302, the robot is provided. In step 303, the object 20 to be gripped is provided. In step 304, structural data of the object 20 is provided. The structural data can be provided, for example, to the controller of the robot and/or to an external computer. The provision of the structural data can also occur at another point in time, for example, before the provision of the robot and/or before the provision of the object.

In step 305, an object coordinate system for the object is defined. This can preferably be realized by the operator at the external computer. Furthermore, this step can preferably take place taking into account the provided structural data.

In step 306, the object is identified by the robot by means of sensors, with this identification likewise being based on the provided structural data.

In step 307, a first gripping pose is taught, with the object 20 being gripped at a first position 22 by the robot. For this purpose, the user guides the robot, preferably directly and actively, by hand to the object to be gripped (so-called playback method). In step 308, a second gripping pose is taught, with the object 20 being gripped by the robot at the position 23. For the teaching of the second pose, too, the robot is preferably directly guided by hand. Alternatively, a guiding using telemanipulation, for example by means of a joystick, is conceivable, or else (although less preferred) a pure offline teaching.

In step 309, additional gripping poses are calculated. This step preferably occurs offline without having to move the robot. In accordance with the situation of FIG. 1a, the gripping poses can be determined such that they are determined making use of the rotational degree of freedom along the edge 21 of the object 20.

In step 310, a first gripping region of the object is configured, based on the taught and determined gripping poses, with the first gripping region being configured in the object coordinate system of the object. In accordance with the situation of FIG. 1a, this first gripping region can be designed such that it allows a gripping of the object 20 at any position along the edge 21, without the robot colliding with the object 20. The configured gripping region is advantageously stored. The method 300 then ends in step 311.

The person skilled in the art will understand that at least some steps of the method 300 can be executed multiple times, in order to identify additional gripping regions at the same object, for example.

Figure 4:
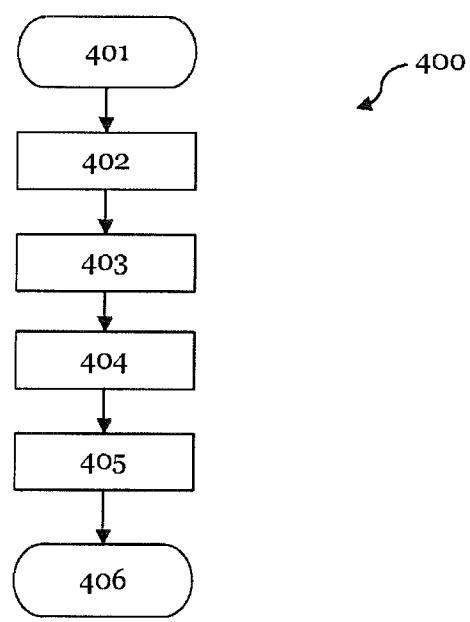
FIG. 4 shows a flowchart, which likewise depicts, in a schematic and exemplary manner, the sequence of a method for determining gripping regions at an object.

FIG. 4 depicts an exemplary method 400. This method begins in step 401. In step 402 a local coordinate system for the object is configured. For this purpose, for example, the object can be placed on a marker, with the position of the marker being permanently defined. The marker position can be measured using known methods (for example, base measurement, optical marker detection, etc.). Alternatively, a sensor system can also be used, to allow identification of the object based on existing models.

In step 403, a grip offset is determined. This grip offset corresponds to the position of the area to be gripped in relation to the local coordinate system of the object.

In step 404, a robot is brought into a first gripping pose at the object, and the current position of the tool center point is taught. This too preferably occurs by means of a direct and active guiding of the robot by hand to the object to be gripped or by means of guiding using telemanipulation. There is then determination of an end effector offset to this first gripping pose in relation to the position of the region to be gripped.

In step 405, the limits of the gripping region relative to the first gripping pose are determined. For this purpose, the tool center point for each of the limits to be determined is taken to the corresponding outer edge of the gripping region and the current position is taught. For this, the user can optionally also make use of translational and/or rotational degrees of freedom of the object, in order to determine the limits of the gripping region. The method 400 ends in step 406.

For the gripping of an object by a robot based on a specific gripping region, an applicable gripping pose is determined based on the determined gripping region. On the basis of this determined gripping pose, the robot approaches this gripping pose and grips the object.

The person skilled in the art will understand that several of the above-described steps comprise several individual steps such as coordinate transformations, for example. Thus, for example, the step of configuration of a gripping region or also the selection of a gripping pose based on a gripping region can comprise the transformation of several positions.

Further, It should be noted that the invention claimed herein is not limited to the described embodiments, but may be otherwise variously embodied within the scope of the claims listed infra.

REFERENCE NUMERALS 10, 10' Robot arm
11, 11' Gripper
20, 20' Object
21, 21' Edge, handle
22, 23, 22', 23' Gripping point
30, 30' Global coordinate system
31, 31' Object coordinate system

The invention claimed is:

1. A method for determining at least one gripping region at an object, wherein the object is to be gripped by a gripper in a gripping pose in the gripping region, which method includes the following steps:
   a) defining an object coordinate system of the object, which is to be gripped by the gripper;
   b) providing structural data of the object;
   c) configuring at least one first gripping pose by positioning the gripper at the object;
   d) specifying at least one additional gripping pose, wherein the specification of at least one additional gripping pose comprises calculating at least one additional gripping pose in the object coordinate system of the object, wherein the calculation is based on provided structural data of the object and on the at least one first gripping pose; and
   e) determining a first gripping region in the object coordinate system of the object based on the at least first and the at least additional gripping pose.

2. The method according to claim 1, wherein the object coordinate system is a Cartesian coordinate system and/or wherein the steps a) through e) are carried out offline.

3. The method according to claim 1, wherein the structural data is of CAD data.

4. The method according to claim 1, additionally including the step of:
   provisioning of the object on a pre-defined marker.

5. The method according to claim 4, wherein the gripper is guided by a robot, and wherein the provisioning of the object comprises an identification of the object by the robot by means of at least one sensor, wherein the at least one sensor comprises an optical sensor and wherein the identification is based on the provided structural data.

6. The method according to claim 1, wherein the specification of the at least one additional gripping pose occurs based on rotational and/or translational degrees of freedom of the object.

7. The method according to claim 1, wherein the configuration by positioning in accordance with step c) comprises the guiding of the gripper to the actual object.

8. The method according to claim 7, wherein the guiding of the gripper to the actual object comprises at least one of an active guiding of the gripper by hand or an active guiding of the gripper using a telemanipulation device.

9. The method according to claim 1, wherein the gripper is guided by a robot, additionally comprising the steps of:
   providing the robot and the gripper, which is guided by the robot, and
   providing at least one object, which is gripped by the robot by means of the gripper.

10. A method for gripping an object by means of a robot, which method includes the following steps:
    a) provisioning of a gripping region determined according to claim 1;
    b) provisioning of at least one robot and at least one object which is to be gripped by the robot;
    c) selecting of a gripping pose based on the provided gripping region;
    d) approaching the selected gripping pose; and
    e) gripping the object.

11. A robot system, comprising a robot, wherein the system is equipped with a control device, which is configured to execute a method according to any one of claims 1-10.

12. The method according to claim 8, wherein the telemanipulation device is a joystick.

* * * * *